United States Patent
Ishikawa

(10) Patent No.: US 8,848,979 B2
(45) Date of Patent: Sep. 30, 2014

(54) TRACKED OBJECT DETERMINATION DEVICE, TRACKED OBJECT DETERMINATION METHOD AND TRACKED OBJECT DETERMINATION PROGRAM

(75) Inventor: Masumi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 13/256,577

(22) PCT Filed: Mar. 30, 2010

(86) PCT No.: PCT/JP2010/055655
§ 371 (c)(1), (2), (4) Date: Oct. 10, 2011

(87) PCT Pub. No.: WO2010/113929
PCT Pub. Date: Oct. 7, 2010

(65) Prior Publication Data
US 2012/0020524 A1    Jan. 26, 2012

(30) Foreign Application Priority Data
Mar. 31, 2009   (JP) ................................. 2009-085963

(51) Int. Cl.
G06K 9/00 (2006.01)
H04N 5/225 (2006.01)
H04N 7/18 (2006.01)
H04N 5/228 (2006.01)

(52) U.S. Cl.
CPC ..................... H04N 7/183 (2013.01)
USPC ........... 382/103; 348/169; 348/170; 348/171; 348/208.14; 348/208.3

(58) Field of Classification Search
None
See application file for complete search history.

(56) References Cited

U.S. PATENT DOCUMENTS
2002/0159637 A1* 10/2002 Echigo et al. ................. 382/190

FOREIGN PATENT DOCUMENTS
JP   8-191411 A   7/1996
JP   2004078432 A   3/2004
JP   2006012012 A   1/2006

OTHER PUBLICATIONS

International Search Report for PCT/JP2010/055655 mailed Apr. 27, 2010.
Y. Torii et al., "Extracting follow and close-up shots from moving images", MIRU2005, Jul. 2005.
Y. Iwai et al., "A Survey on Face Detection and Face Recognition", IPSJ SIG Technical Reports (CVIM-149), May 2005, pp. 1-26.

* cited by examiner

Primary Examiner — Matthew Bella
Assistant Examiner — Weiwen Yang
(74) Attorney, Agent, or Firm — Sughrue Mion, PLLC

(57) ABSTRACT

Determination whether a moving object appearing in input video is an object tracked and captured by a cameraman is enabled. It is determined that a moving object is a subject image to which a cameraman pays attention based on a time difference between time when a movement state determined by a motion vector of the moving object changes and time when a shooting state determined by a motion vector of a camera motion changes.

36 Claims, 14 Drawing Sheets

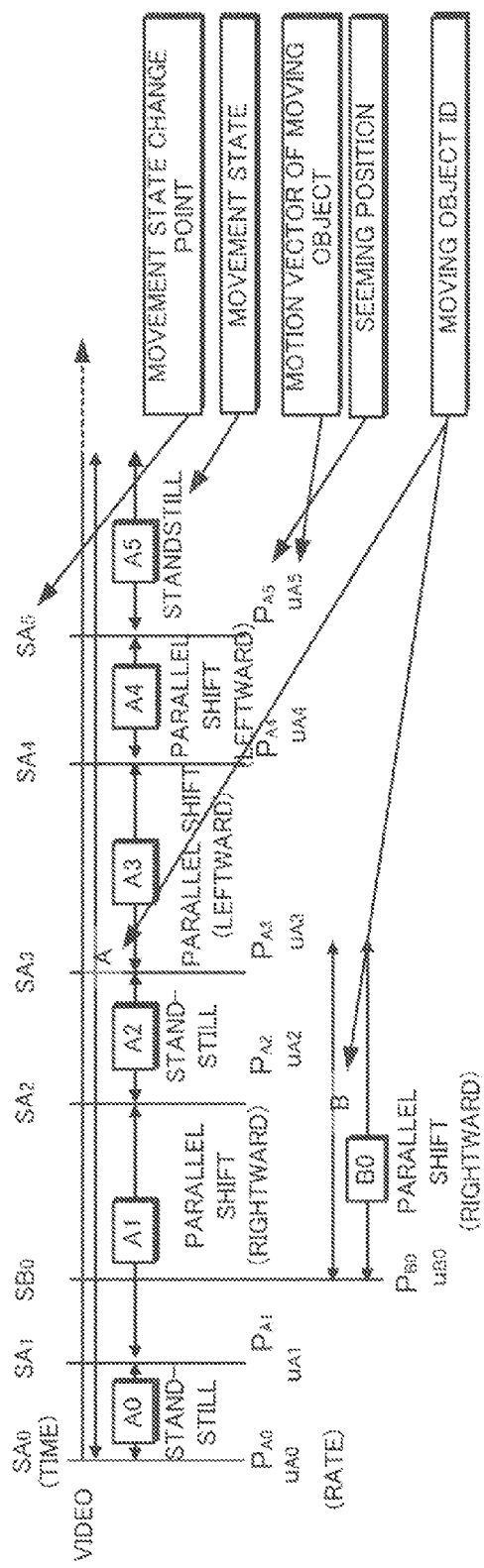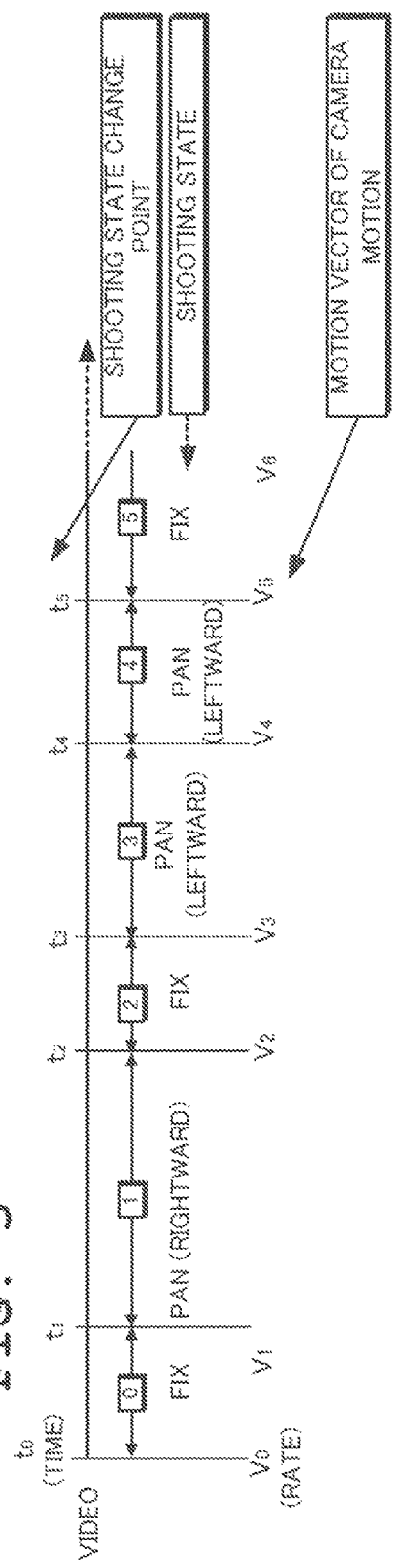

FIG. 14

| MOVING OBJECT ID | IMAGE | APPEARING TIME | DETERMINATION RESULT |
|---|---|---|---|
| A | | SA1 | TRACKING |
| A | | SA2 | TRACKING |
| B | ● | SB0 | NON-TRACKING |
| A | | SA3 | TRACKING |
| A | | SA4 | TRACKING |

FIG. 15

| MOVING OBJECT ID | IMAGE | APPEARING TIME | DETERMINATION RESULT |
|---|---|---|---|
| A | | SA1, SA2, SA3, SA4 | TRACKING |
| B | ● | SB0 | NON-TRACKING |

TRACKED OBJECT DETERMINATION DEVICE, TRACKED OBJECT DETERMINATION METHOD AND TRACKED OBJECT DETERMINATION PROGRAM

TECHNICAL FIELD

The present invention relates to a tracked object determination device, a tracked object determination method and a tracked object determination program and, more particularly, a tracked object determination device, a tracked object determination method and a tracked object determination program for determining whether an object appearing in video is an object tracked by a cameraman.

BACKGROUND ART

Tracked object is a moving object which is captured to appear continuously on a screen and is assumed to be paid attention by a cameraman. Detection of the tracked objects, therefore, is required for generation of summarized video or extraction of key frames which are used for recognizing important objects in video.

One example of a tracked object determination device is recited in Patent Literature 1 (Japanese Patent Laying-Open No. 08-191411).

The method recited in Patent Literature 1 is to calculate a possibility of existence of a tracked object in a video segment where shooting is executed by a camera moving in a fixed direction based on a distribution of moving regions which are image regions having a vector different from a motion vector generated by motion of the camera. In this method, "a set of moving regions constantly existing in the lump" is determined to be a tracked object by using the degree of lumping of moving regions obtained by the number of pixels in a moving region, the degree of concentration, a position of the center of gravity and the degree of dispersion, or the stationary degree obtained by a rate of the number of frames including moving regions in the video segment.

Structure for determining a tracked object includes, as shown in FIG. 23, a motion vector detection unit 300 which detects a motion vector with respect to each frame of video, a panning section detection unit 301 which detects a start point and an end point of a panning section based on a motion vector of each frame of video, a moving region information detection unit 302 which detects, as a moving region, a region whose correlation degree is low between a motion compensation predicted image as a predicted image which is shifted in parallel from a past video frame by the amount of a motion vector and a current frame to extract distribution information of the region, and a scene determination unit 303 which determines, based on distribution information of a moving region detected in each panning section, that the section corresponds to a scene which tracks the object.

Patent Literature 1: Japanese Patent Laying-Open No. H08-191411.

Non-Patent Literature 1: Yousuke Torii, Seiichi Konya and Masashi Morimoto, "Extracting follow and close-up shots from moving images", MIRU2005, pp. 24-31.

Non-Patent Literature 2: Yoshio Iwai, Shihong Lao, Osamu Yamaguchi, Takatsugu Hirayama, "A Survey on Face Detection and Face Reconition", IPSJ SIG Technical Reports (CVIM-149), 2005, pp. 343-368.

The first problem of the related art method is that a moving object is not determined as a tracked object when a camera cannot be moved approximately with the same speed as the moving object.

Moving object cannot be determined to be a tracked object in a case, for example, where shot ends before a shifting rate of a camera comes to be equal to a shifting rate of a moving object because of shortness of the shot, where a cameraman is not allowed to predict a shifting destination of a moving object because the moving object moves at random or where a camera shifting rate varies as a moving object moves such as a case of shooting by a telephoto camera.

The reason is that whether a moving object is an object to be tracked or not is determined by a state of distribution of moving regions as an image region having a motion vector different from a motion vector generated by movement of the camera. Accordingly, when a distribution of moving regions fails to satisfy the property that "constantly exists in the lump" because the movement of the camera differs from a shifting rate of the moving object, the moving object as a set of moving regions cannot be determined to be a tracked object.

Second problem of the related art method is that a moving object cannot be judged as a tracked object before the end point of a video segment captured with a fixed direction.

The reason is that because whether a moving object is an object to be tracked or not is determined based on a rate of the number of frames in which the moving object can be stably tracked within the video segment, the moving object cannot be determined to be a tracked object unless a length of the video segment is obtained.

OBJECT OF THE INVENTION

An object of the present invention is to determine a moving object appearing in video as an object tracked and captured by a cameraman.

SUMMARY

According to a first exemplary aspect of the invention, a tracked object determination device, includes a unit which determines whether a moving object is tracked or not by a cameraman based on a time difference between time when a movement state determined by a motion vector of the moving object changes and time when a shooting state determined by a motion vector of a camera motion changes.

According to a second exemplary aspect of the invention, a tracked object determination method, includes determining whether a moving object is tracked or not by a cameraman based on a time difference between time when a movement state determined by a motion vector of the moving object changes and time when a shooting state determined by a motion vector of a camera motion changes.

According to a third exemplary aspect of the invention, a tracked object determination program, which causes a computer to execute a processing of determining whether a moving object is tracked or not by a cameraman based on a time difference between time when a movement state determined by a motion vector of the moving object changes and time when a shooting state determined by a motion vector of a camera motion changes.

First effect of the present invention is that a moving object can be determined as a tracked object even if a camera cannot be moved approximately with the same speed as the moving object. Therefore, a moving object can be determined to be a tracked object according to a time difference between the change point of movement state of moving object and the change point of shooting state of camera even if its position on a screen gradually changes, for example, when a video shot is too short for cameraman to catch up the moving object, or when a cameraman cannot predict the motion of an object since it moves at random, or when camera motion is not stable because a telephoto camera is used.

Second effect of the present invention is that a moving object can be determined to be a tracked object even without obtaining a length of a video segment. Therefore it is possible to determine whether a moving object is tracked or not before the end point a video segment captured with a fixed direction.

BRIEF DESCRIPTION OF THE DRAWINGS

FIG. 2 is a diagram showing one example of time of a movement state change point and moving object information according to the first exemplary embodiment;

FIG. 3 is a diagram showing one example of time of a shooting state change point and a shooting state according to the first exemplary embodiment;

FIG. 14 is a diagram showing one example of output of a tracking determination result according to the first exemplary embodiment;

FIG. 15 is a diagram showing one example of output of a tracking determination result according to the first exemplary embodiment;

EXEMPLARY EMBODIMENT

Next, exemplary embodiments of the present invention will be described in detail with reference to the drawings.
(First Exemplary Embodiment)

Figure 1:
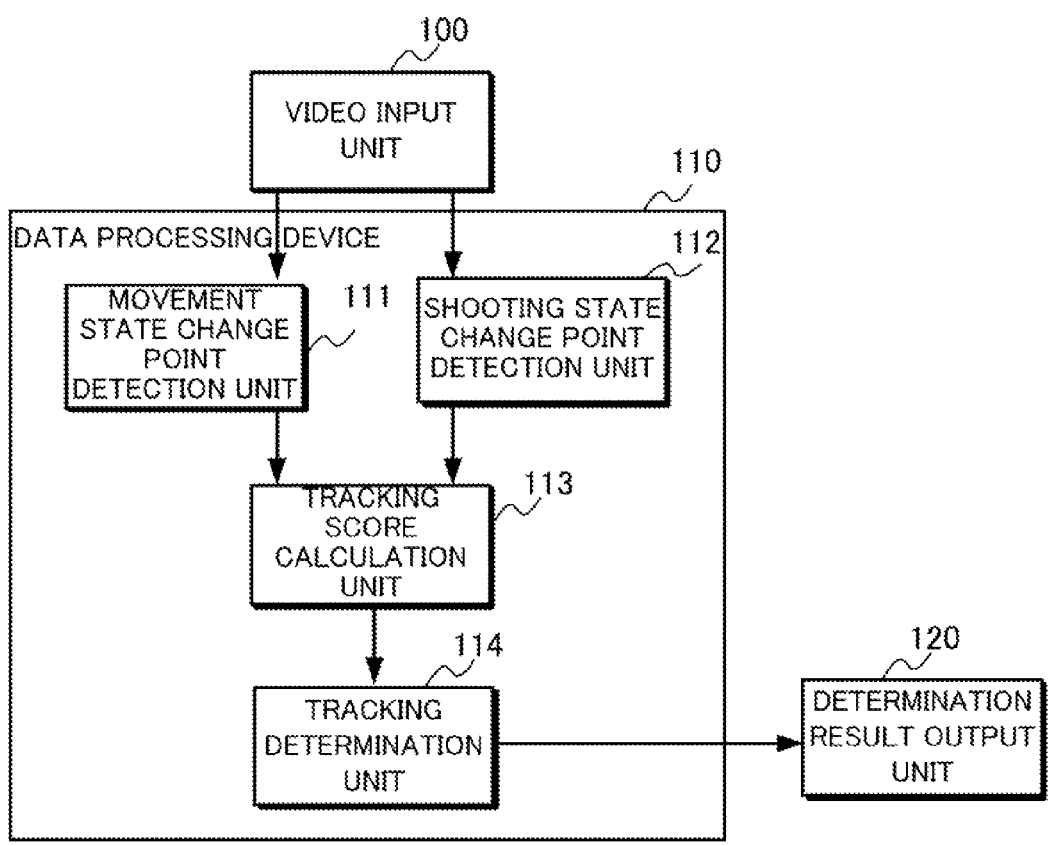
FIG. 1 is a block diagram showing a structure of a tracked object determination device according to a first exemplary embodiment of the present invention.

With reference to FIG. 1, a tracked object determination device according to a first exemplary embodiment of the present invention includes a video input unit 100 which inputs video, a data processing device 110 operable under the control of a program and a determination result output unit 120 which outputs a tracking determination result of each moving object.

The video input unit 100 inputs image information of each frame which forms video to the data processing device 110.

The data processing device 110 includes a movement state change point detection unit 111, a shooting state change point detection unit 112, a tracking score calculation unit 113 and a tracking determination unit 114.

The movement state change point detection unit 111 has a function of detecting a movement state change point as time when a movement state determined by a motion vector of a moving object changes.

The movement state change point detection unit 111 detects a moving object from a frame image received from the video input unit 100 and obtains a moving object ID, image data of the moving object, seeming position coordinates of the moving object, a motion vector of the moving object and a movement state of the moving object as moving object information.

The movement state change point detection unit 111 detects a movement state change point as time when a movement state of the moving object changes, obtains time of a movement state change point and moving object information as of the movement state change point and inputs the same to the tracking score calculation unit 113.

Moving object denotes a body moving around such as a car, a ball, an animal or a person which excludes liquid such as water.

Seeming position coordinates of a moving object here represent a position on a camera coordinate system which is a relative positional relationship between a camera and a moving object. Motion vector of a moving object is assumed not to be a motion vector (seeming motion vector) in a camera coordinate system which represents a relative motion between camera operation and movement of a moving object but to be a motion vector (absolute motion vector) in a two-dimensional coordinate system which projects a position in real space.

Movement state of a moving object represents a state determined by a motion vector of the moving object, and each state may be defined by determining a threshold value in advance with respect to a direction or a size of a motion vector or defined by a kind of motion vector such as parallel/vertical movement with respect to a camera image pickup plane.

Movement state change point is assumed to be time when a movement state of a moving object changes. FIG. 2 shows one example of time of a movement state change point and moving object information at the movement state change point.

The shooting state change point detection unit 112 has a function of detecting a shooting state change point as time when a shooting state defined by a motion vector of a camera motion of video changes.

The shooting state change point detection unit 112 obtains a motion vector of a camera motion and a shooting state as shooting information from each frame of video received from the video input unit 100.

The shooting state change point detection unit 112 also detects a shooting state change point (time) as time when a shooting state changes, obtains the shooting state change point and shooting information at the shooting state change point and inputs the same to the tracking score calculation unit 113.

Motion vector of a camera motion is assumed to be a motion vector on a two-dimensional coordinate system which projects a position of a center point of a frame image of a camera in real space.

Shooting state is a state determined by a motion vector of a camera motion and each state may be defined by determining a threshold value in advance based on a direction or a size of the motion vector of the camera motion or defined by a kind of camera motion such as pan, tilt, zoom and fix.

Change point of a shooting state is assumed to be time when the shooting state changes. FIG. 3 shows one example of time of a shooting state change point and shooting information as of the shooting state change point.

The tracking score calculation unit 113 has a function of calculating, with a difference between time of a shooting state change point and time of a movement state change point as a time difference of a moving object, a tracking score of the moving object based on the time difference of the moving object.

When receiving time of a movement state change point and moving object information as of the movement state change point from the movement state change point detection unit 111 and time of a shooting state change point and shooting information as of the shooting state change point from the shooting state change point detection unit 112, the tracking score calculation unit 113 calculates a tracking score of the moving object based on a time difference between the time of the movement state change point and the time of the shooting state change point.

The tracking score calculation unit 113 inputs a tracking score of a moving object and moving object information to the tracking determination unit 114.

Tracking score will be described with reference to FIG. 2, FIG. 3 and FIG. 4 which summarizes FIG. 2 and FIG. 3.

Consideration will be made, for example, of a case of tracking and shooting a mouse which stands still, starts running rightward, suddenly stands still and then starts running leftwards. State of movement of the mouse on this occasion can be represented as a movement state of a moving object A shown in FIG. 2.

On the other hand, a cameraman starts operating a camera in line with movement of the mouse and after moving the camera rightward at a fixed rate, because of being incapable of predicting that the mouse will stop at a next instance, he/she makes the camera stand still with an instantaneous delay from the time when the mouse stood still. When the mouse subsequently starts running leftward, he/she starts moving the camera leftward with an instantaneous delay from the start of the running. Shooting state on this occasion is represented as shown in FIG. 3.

Assume that a ball rolling rightward comes into video to appear. With the ball denoted as a moving object B, a movement state thereof will be represented as shown in FIG. 2. Since the ball is not a tracked object here, cameraman's operation of the camera will not be affected by the motion of the ball.

With an instantaneous delay required for a cameraman to change a shooting state in response to a change of movement of the moving object as a time difference, the time difference with respect to the moving object A is calculated between time sA1 of a point where a movement state of the moving object A changes and time t1 of a point where a shooting state changes, between time sA2 and time t2, between time sA3 and time t3, between time sA4 and time t4 and between sA5 and time t5.

Time difference with respect to the moving object B is calculated between time sB0 of a point where the movement state of the moving object B changes and time t2 of a point where the shooting state changes. Examples of time differences related to the moving bodies A and B are shown in FIG. 4.

Since the cameraman changes the shooting state in line with the movement of the moving object A as a tracked object in order to always catch the moving object A by the camera, each time difference calculated with respect to the moving object A is predicted to assume a value within a fixed range.

In addition, since the cameraman fails to track the moving object B, a time difference calculated with respect to the moving object B is predicted to assume a value outside the fixed range.

In the present exemplary embodiment, therefore, a function is set that assumes a high value when the time difference is within a fixed range and a low value when the same is outside the fixed range based on the above-described tendency and a tracking score is calculated based on the function and the time difference.

The tracking determination unit 114 has a function of determining that a moving object is a tracked object based on a tracking score of the moving object.

The tracking determination unit 114 determines whether a moving object is a tracked object or not based on a tracking score of the moving object input from the tracking score calculating unit 113 and inputs a tracking determination result and moving object information of the moving object to the determination result output unit 120.

The determination result output unit 120 outputs the tracking determination result and the moving object information of the moving object applied from the tracking determination unit 114.

(Description of Operation of the First Exemplary Embodiment)

Figure 5:
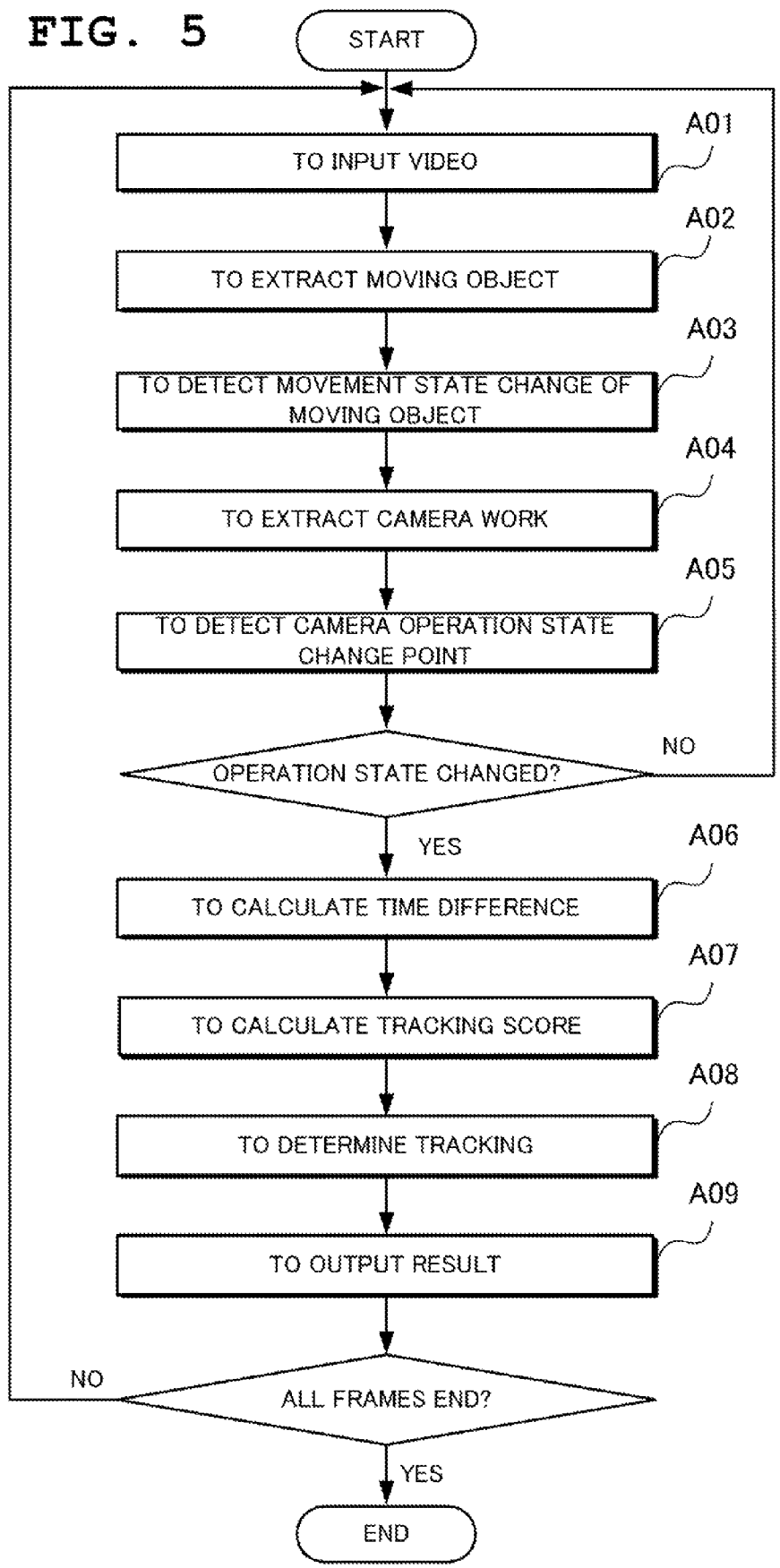
FIG. 5 is a flow chart showing operation of the tracked object determination device according to the first exemplary embodiment of the present invention.

Next, detailed description will be made of entire operation of the present exemplary embodiment with reference to FIG. 1 and the flow chart of FIG. 5. First, the video input unit 100 inputs each frame forming input video to the movement state change point detection unit 111 and the shooting state change point detection unit 112 (Step A01).

Upon receiving a frame image from the video input unit 100, the movement state change point detection unit 111 detects a moving object to extract a moving object ID, image data of the moving object, a seeming position of the moving object, a motion vector of the moving object and a movement state of the moving object as moving object information (Step A02).

Possible method of detecting a moving object when the moving object is known is a template-based method. In the template-based method, a difference in a pixel value is calculated between a template image of a moving object stored in advance and an input frame and when the difference is not more than a threshold value, determination is made that the moving object exists in the input image.

Alternatively, it is possible to prepare template images of various sizes in advance to detect a region of a moving object by using a template with which a difference in a pixel value is the smallest.

It is also possible to extract a region with which a difference from a template image prepared in advance is the smallest from a frame image and use the same as a new template image.

Even when a configuration or a size of the moving object changes while shifting, use of a plurality of templates or template registration of a region extracted from a frame image produces an effect of stably detecting a moving object.

Possible method of detecting a moving object in a case where the moving object is unknown is a method based on block-matching. In the block-matching-based method, an input frame is sectioned into unit blocks and with respect to each unit block, a distance from a region from which the highest similarity is calculated from past frames is obtained as a motion vector of each unit block.

Also executed is to group blocks having motion vectors whose direction and size are similar and detect a block group belonging to the largest group excluding a group having a motion vector generated by movement of a camera as a moving region.

Usable for the detection of a moving object is a template-based method, a block-matching-based method or other method.

Moving object ID may be serially numbered in the order of detection, or with an ID applied to a template in advance, an ID of a template used when a moving object is detected may be applied to the moving object.

As image data of a moving object, a moving object region detected from an image frame may be cut out and used, a rectangular region including a moving object region may be cut out and used, a cut-out image region may be converted into a configuration and a size determined in advance and used, or a template image used at the time of detection may be used.

Used as a seeming position of a moving object may be a position of the center of gravity of a moving object region in a frame image, the center of gravity of a rectangular region including a moving object region or four vertexes of a rectangular region including a moving object region.

Motion vector of a moving object is obtained in a manner as described in the following.

Figure 6:
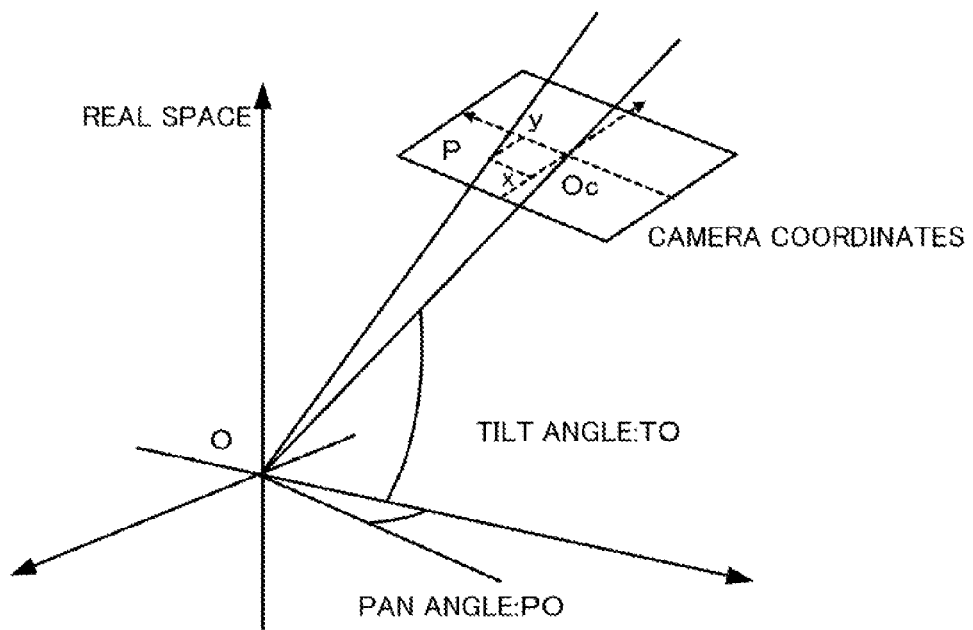
FIG. 6 is a diagram for use in explaining relationship between a point P on a camera coordinate system and a pan angle and a tilt angle which are camera turning angles according to the first exemplary embodiment.

An arbitrary point in a frame image can be expressed using a two-dimensional absolute coordinate system expressed by a pan angle and a tilt angle as a camera turning angle. As shown in FIG. 6, in a case, for example, where a frame image center point (origin on a camera coordinate system) Oc is denoted as (P0, T0) by using a pan angle P0 and a tilt angle T0 as a camera turning angle, a position of the point P on the absolute coordinate system on the frame image is expressed by Expression 1.

(NUMERICAL EXPRESSION 1)

$$P(X, Y) = \left( \tan^{-1}\left(\frac{x}{f}\right) + P0, \tan^{-1}\left(\frac{y}{\sqrt{x^2+f^2}}\right) + T0 \right)$$ (Expression 1)

With f as a focus of a lens system and x and y as seeming positions, a position on an imaging plane is calculated from the size and the number of pixels of a camera image pickup element CCD. When x, y<<f, the Expression 1 can be approximated as shown in the following.

$$P(X, Y) = (\alpha x + P0, \beta y + T0)$$ (Expression 2)

$\alpha$ and $\beta$ are calculated by $\alpha = \Delta P/\Delta x$ and $\beta = \Delta T/\Delta y$ when an arbitrary point (x, y) on the camera coordinate system shifts to (x+$\Delta$x, y+$\Delta$y) in a case where the pan angle of the camera turns from P0 by $\Delta$P and the tilt angle turns from T0 by $\Delta$T. $\alpha$ and $\beta$ are calculated in advance with respect to each f.

A motion vector of the moving object is obtained by converting a seeming position (x, y) of a representative point P in an image region of the moving object and a seeming position of a representative point P' at unit-time preceding time into points P(X, Y) and P'(X', Y') on the absolute coordinate system according to the Expression 2, respectively, and by calculating a difference between them.

Alternatively, it is also possible to calculate a difference between each point of a plurality of representative points P1 through Pn on absolute coordinates in the image region of the moving object and each point of representative points P1' to Pn'' on the absolute coordinates at unit-time preceding time and use an average of a number n of motion vectors calculated at the respective points.

The pan angle P0 and the tilt angle T0 are both set to be 0 degree in an initial state of the camera and obtained as a camera rotation angle from a shot start time to a current frame. P0 and T0 are obtained by using an angular velocity sensor mounted on a camera.

It is alternatively possible to extract a motion vector obtained from other region than the moving object as a motion vector reflecting movement of the camera, accumulate motion vectors reflecting the movement of the camera which are extracted from the respective frames from the shot start until now and calculate P0 and T0 from a relationship between the accumulated values obtained in advance and the pan angle and the tilt angle.

State of movement of the moving object is determined as follows by using a motion vector of the moving object.

Used is, for example, a mean value of a motion vector calculated in several past frames.

It is also possible to set such classification as "high rate", "medium rate" and "low rate" by threshold processing of a size of a motion vector.

Further possible is to set such classification as "0 to 90 degrees", "90 to 180 degrees", "180 to 225 degrees" and "225 to 360 degrees" by threshold processing of a direction of a motion vector.

Further possible is to set such classification as "still", "rightward parallel shift (with respect to camera image pickup plane)", "leftward parallel shift", "upward parallel shift" and "downward parallel shift".

Alternatively, it is possible to calculate an acceleration in a current frame based on motion vectors in several past frames and use a mean value of accelerations calculated in the several past frames.

Acceleration a can be obtained by Expression 3 when a moving object moving by a motion vector u' moves by a motion vector u in a Δt preceding frame.

(NUMERICAL EXPRESSION 2)

$$\alpha = \frac{u' - u}{\Delta t} \quad \text{(Expression 3)}$$

Motion vector and a movement state of a moving object may be obtained by a GPS sensor and an angular velocity sensor mounted on the moving object in advance or by other method.

The movement state change point detection unit 111 detects a movement state change point at which a movement state of the moving object changes and inputs time of the movement state change point and moving object information as of the movement state change point to the tracking score calculation unit 113 (Step A03).

As a movement state change point of the moving object, time when a mean value of motion vectors or a mean value of accelerations of motion vectors exceeds a threshold value is detected as a change point. It is alternatively possible to detect time of a current frame as a change point in a case where in the classification determined by the threshold processing of a motion vector, classification to which the current frame belongs is different from classification to which a preceding frame belongs.

With a state where the moving object keeps uniform motion or uniformly accelerated motion as a stationary state, a change point of a movement state of the moving object is assumed to be a point where a certain stationary state starts making a transition to a subsequent stationary state. Transitional state from a stationary state until shift to a subsequent stationary state is assumed to be included in the subsequent stationary state.

The shooting state change point detection unit 112 obtains a motion vector of a camera motion and a shooting state determined by a motion vector of a camera motion as shooting information from each frame received from the video input unit 100 (Step A04). One example of a method of obtaining a motion vector of a camera motion by image processing is recited in Non-Patent Literature 1.

Recited in the Non-Patent Literature 1 is detecting a corner point from a leading frame of a shot and tracking a corner point with respect to a group of successive frames in the same shot. Extraction and tracking of corner points can be realized by a method of Lucas-Kanade-Tomasi.

Next, assume that a camera motion can be expressed by parallel shift in x and y directions, expansion/reduction and rotation, camera motion is calculated based on a camera work model shown in Expression 4.

(NUMERICAL EXPRESSION 3)

$$\begin{pmatrix} x \\ y \end{pmatrix} = \frac{1}{z} \left\{ \begin{pmatrix} 1 & -\theta \\ \theta & 1 \end{pmatrix} \begin{pmatrix} x' \\ y' \end{pmatrix} + \begin{pmatrix} dx \\ dy \end{pmatrix} \right\} \quad \text{(Expression 4)}$$

(x, y) are assumed to be seeming coordinates at a corner point in a current frame Fi and (x', y') are assumed to be seeming coordinates at a corner point corresponding to (x, y) detected by corner point tracking from a frame Fi' which is one unit-time preceding Fi.

Parameter set {z, dx, dy, θ} represents a camera motion between the frame Fi and the frame Fi', with z as an expansion/reduction parameter, dx and dy as parallel movement in the x and y directions, respectively, and θ as a rotation parameter.

The above-described model is premised on that the rotation angle θ is small, which can be used when movement of the camera in the rotation direction is ignorable. Expansion/reduction operation denotes either zoom or dolly and parallel shift denotes any of track, boom, pan and tilt shooting.

The parameter set {z, dx, dy, θ} can be calculated by substituting two corresponding pairs {(x, y), (x', y')} corresponding to the corner points into the Expression 4.

Possible as a parameter set calculation method is a method of calculating a parameter set by using two corner points selected because of high reliability as a corner point.

For suppressing effects exerted by local movement of a moving object, there are a method of selecting the most frequently used parameter set among a group of parameter sets calculated in all the combinations of the pairs corresponding to the corner points and a method of selecting a center value of the parameter set group calculated in all the combinations of the pairs corresponding to the corner points.

As a method of calculating a parameter set, any of the above-described methods or other method can be used.

A motion component in a direction parallel to an image pick-up plane of the camera among motion vectors of a camera motion can be calculated by a difference between a seeming position (x, y) of a center point Oi of the current frame Fi and a seeming position (x', y') of a center point Oi' as of unit-time preceding Oi which are converted into absolute coordinates (X, Y) and (X', Y'). Component in the expansion and reduction direction corresponds to a parameter z.

Shooting state is determined in a manner as described in the following by using a motion vector of a camera motion.

Used, for example, is a mean value of a motion vector of a camera motion calculated from several past frames.

Alternatively, such classification as "high rate", "medium rate" and "low rate" may be defined by the threshold processing of a size of a motion vector.

Such classification can be defined as "right pan (right track)", "left pan (left track)", "up tilt (up zoom)", "low tilt (low boom)", "still", "zoom (expansion)" and "zoom (reduction)" by the threshold processing of a direction of a motion vector.

Alternatively, it is possible to calculate an acceleration in a current frame based on a motion vector of a camera motion in several past frames and use a mean value of accelerations calculated in the several past frames.

In a case of shooting with the motion vector u' of a camera motion in a current frame and shooting with the motion vector u in a Δt preceding frame, an acceleration a is obtained by the Expression 3.

Motion vector of a camera motion and a shooting state may be obtained from an operation history of various kinds of sensors and a zooming function mounted on the camera in advance or by using other method.

The shooting state change point detection unit 112 detects a shooting state change point at which the shooting state changes. When a shooting state change point is detected, input time of the shooting state change point and shooting information as of the shooting state change point to the tracking score calculation unit 113. When the same is not detected, execute Step A01 (Step A05).

Detected as a shooting state change point is when a mean value of motion vectors of a camera motion or a mean value of accelerations of a motion vector exceeds a threshold value.

Alternatively, it is possible to detect time of a current frame as a change point when in the classification defined by the motion vector threshold processing, classification to which the current frame belongs differs from classification to which a preceding frame belongs.

With a state where a camera motion maintains a uniform rate or a uniformly accelerated rate as a stationary state, shooting state change point is assumed to be a point where a certain stationary state shifts to a subsequent stationary state. Transitional state from the stationary state until shift to the subsequent stationary state is assumed to be included in the subsequent stationary state.

When time of a shooting state change point is input from the shooting state change point detection unit 112, the tracking score calculation unit 113 calculates a time difference related to each moving object between the input time and time of a movement state change point already input from the movement state change point detection unit 111 (Step A06).

With respect to each moving object, time difference is calculated from a movement state change point detected at most proximate time prior to the time of the shooting state change point.

Alternatively, it is also possible to calculate a time difference from a movement state change point as a movement state similar to a shooting state among movement state change points detected prior to the time of the shooting state change point.

It is further possible to calculate a time difference from a movement state change point as a movement state in which a position in an absolute coordinate system of a moving object predicted after a little time $\Delta t$ from the time of the shooting state change point comes to a point on a frame image after $\Delta t$ among movement state change points detected prior to the time of the shooting state change point.

The tracking score calculation unit 113 calculates a tracking score based on the time difference to input the tracking score and the moving object information in the tracking determination unit 114 (Step A07).

Tracking score Ri of a moving object i is defined to assume a large value when a probability of the moving object i being a tracked object is high and a probability of the moving object i being a non-tracked object is low.

The value can be calculated, for example, by a ratio of the probability of the moving object i being a tracked object to the probability of the moving object i being a non-tracked object as shown in Expression 5. ρ(i is a tracked object|Di) represents a probability that the moving object i is a tracked object when the time difference is Di.

(NUMERICAL EXPRESSION 4)

$$R_i = \frac{\rho(i \text{ IS TRACKED OBJECT} \mid D_i)}{\rho(i \text{ IS NON-TRACKED OBJECT} \mid D_i)} \quad \text{(Expression 5)}$$

The Expression 5 can be developed as follows by the Bayes' theorem. ρ(Di|i is a tracked object) represents a probability that a time difference is Di when the moving object i is a tracked object.

(NUMERICAL EXPRESSION 5)

$$R_i = \frac{\dfrac{\rho(D_i \mid i \text{ IS TRACKED OBJECT}) \, \rho(i \text{ IS TRACKED OBJECT})}{\rho(D_i)}}{\dfrac{\rho(D_i \mid i \text{ IS NON-TRACKED OBJECT}) \, \rho(i \text{ IS NON-TRACKED OBJECT})}{\rho(D_i)}} = \frac{\rho(D_i \mid i \text{ IS TRACKED OBJECT}) \, \rho(i \text{ IS TRACKED OBJECT})}{\rho(D_i \mid i \text{ IS NON-TRACKED OBJECT}) \, \rho(i \text{ IS NON-TRACKED OBJECT})} \quad \text{(Expression 6)}$$

When a number N of moving bodies are included in the same frame, Ri will be calculated as follows.

(NUMERICAL EXPRESSION 6)

$$R_i = \frac{w_i \rho(D_i \mid i \text{ IS TRACKED OBJECT}) \, \rho(i \text{ IS TRACKED OBJECT})}{\rho(D_i \mid i \text{ IS NON-TRACKED OBJECT}) \left( C + \sum_{\substack{j=1 \\ j \neq i}}^{N} w \rho(j \text{ IS NON-TRACKED OBJECT}) \right)} \quad \text{(Expression 7)}$$

j assumes a number (N−1) of values from $1 \leq j \leq N$ ($j \neq i$) and represents an ID of each moving object.

ρ(Di|i is a non-tracked object) represents a probability that the time difference is Di when a moving object is a non-tracked object. Assuming that every time difference Di might evenly occur (uniform distribution) with respect to the non-tracked object i, ρ(Di|i is a non-tracked object) will be a constant.

Assuming a possible range of Di (approximately several seconds in general), ρ(Di|i is a non-tracked object) will be a finite value.

ρ(j is a tracked object) represents an advance probability that j is a tracked object. Assuming that a probability that each moving object from j=i to N will be a tracked object is even, ρ(i is a tracked object) and ρ(j is a tracked object) of all j will be (1−C)/N.

C represents a constant indicative of a probability that a change of a shooting state is not for tracking, which is set based on statistics.

wi represents a weight coefficient which assumes 1 when a movement direction of the moving object i and a shooting direction of a camera are similar and otherwise assumes 0.

From the foregoing, a denominator of the Expression 7 is assumed to take a constant C'.

ρ(Di|i is a tracked object) can be calculated by the following function.

(1) Method Using Statistic-Based Function

Figure 7:
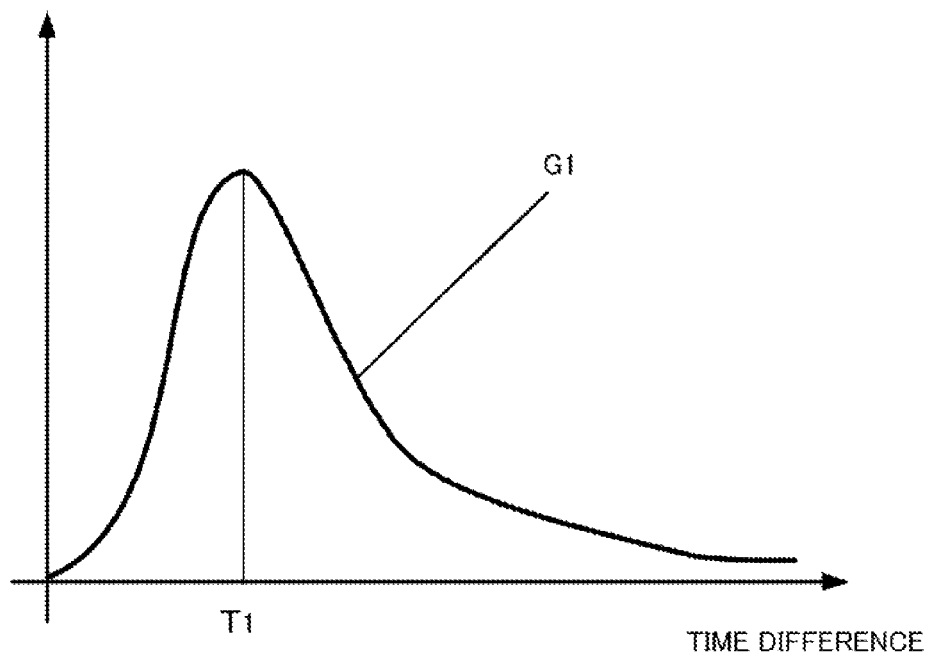
FIG. 7 is a diagram showing one example of a function expressing a relationship between ρ(Di|i is a tracked object) and a time difference based on a statistic according to the first exemplary embodiment.

Time difference corresponds to a reaction rate of a cameraman from recognition of a change of a movement state of a moving object to changing of a shooting state of a camera. Therefore, set a function based on a statistic of a common human reaction rate.

ρ(Di|i is a tracked object) can be represented by the function shown in FIG. 7, for example. With a mode of a common human reaction rate as T1, a function G1($t$) in FIG. 7 assumes 100% when the time difference is T1 and assumes 0% when the time difference is 0. As a result, the closer to a common human reaction rate the time before changing of the shooting state in response to a change of movement of a moving object becomes, the higher becomes the value which can be calculated.

It is also possible to set a function based on statistics with respect to a reaction rate inherent to a cameraman. As a result, a value according to a cameraman's habit can be calculated.

(2) Method Using Function Based on Position and Rate of Moving Object on Screen

Time difference changes according to a position and a rate of a moving object on a screen. When a moving object located at the right end of the screen changes its movement rightward, for example, the cameraman changes the shooting state by a short time difference in order to seize the moving object on the screen.

Conversely, when the moving object located at the center of the screen changes its movement, it takes more time for the moving object to move to the outside of the screen than in a case where the moving object located at the right end changes its movement rightward, so that a time difference will be large.

Assuming that a time difference changes according to a position and a rate of the moving object on the screen based on the above-described properties, when the moving object i which moves to have the seeming motion vector u at the seeming position (x, y) is a tracked object, ρ(Di|i is a tracked object) can be calculated as set forth below by using a probability ρ(Di|i is a tracked object, (x, y), u) that the time difference is Di.

Figure 8:
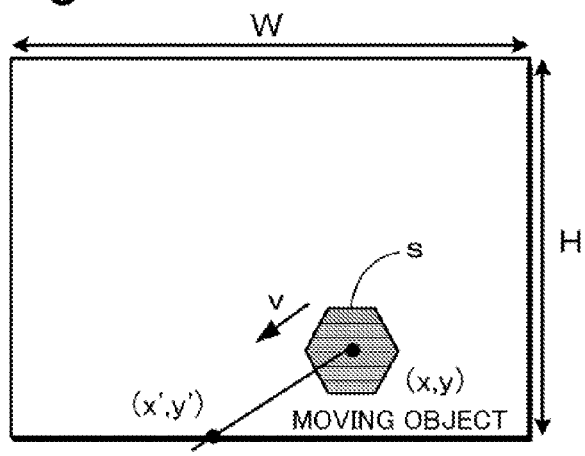
FIG. 8 is a diagram for use in explaining a seeming movement state of a moving object on a screen according to the first exemplary embodiment.

(NUMERICAL EXPRESSION 7)

$$\rho(D_i \mid i \text{ IS TRACKED OBJECT}) = \frac{\rho(D_i \mid i \text{ IS TRACKED OBJECT}, (x, y), u)}{\rho((x, y), u)} \quad \text{(Expression 8)}$$

ρ((x, y), u) represents a probability that a moving object appears in video at the seeming position (x, y) and with the seeming motion vector u, which can be handled as a constant value when assuming that a probability that the moving object appears at each position and at each rate is all equal.

ρ(Di|i is a tracked object, (x, y), u) can be also obtained by the following manner. Assume, for example, that seeming position coordinates of the center of gravity of the moving object at time when the movement state of the moving object changes is (x1, y1), a width of a frame is W and a height is H as shown in FIG. 8. On this occasion, the seeming motion vector u can be expressed by a difference between (x1, y1) and seeming position coordinates (x1', y1') at which (x1, y1) existed a predetermined unit-time before.

Assuming that the moving object makes uniform linear movement with the motion vector u, when coordinates of the center of gravity of the moving object are set to be a start point and an intersection between a straight line drawn in parallel to the motion vector u and a frame is represented as (x2, y2), time T2 required for the moving object to move to the outside of the screen is expressed as follows.

(NUMERICAL EXPRESSION 8)

$$T_i = \frac{\sqrt{(x_1 - x_2)^2 + (y_1 - y_2)^2}}{|u|} \quad (u \neq 0) \quad \text{(Expression 9)}$$

Figure 9:
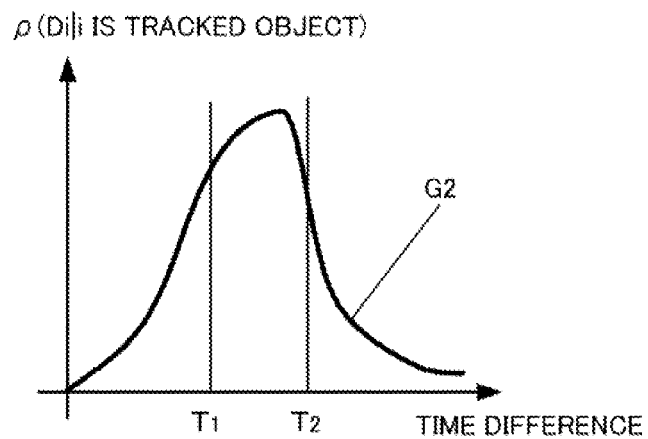
FIG. 9 is a diagram showing one example of a function expressing a relationship between a probability that the time difference is Di when a moving object i is a tracked object and the time difference based on a position and a rate of the moving object on the screen according to the first exemplary embodiment.
Figure 10:
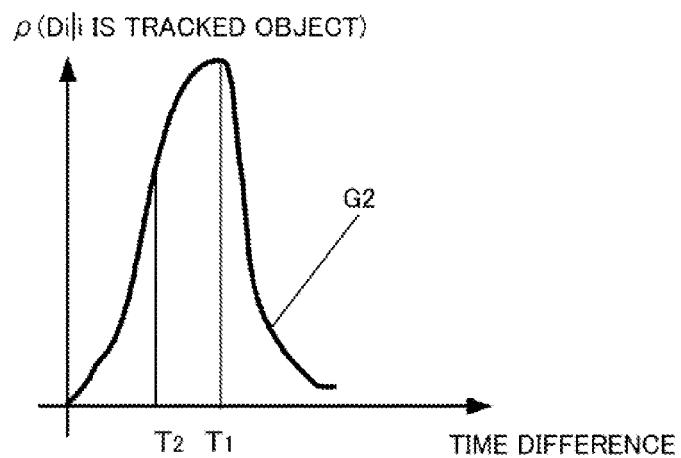
FIG. 10 is a diagram showing one example of a function expressing a relationship between a probability that the time difference is Di when the moving object i is a tracked object and the time difference based on a position and a rate of the moving object on the screen according to the first exemplary embodiment.

On this occasion, ρ(Di|i is a tracked object, (x, y), u) can be expressed by using a function G2 shown in FIG. 9 and FIG. 10.

When T2>T1, the cameraman detects having time before the moving object becomes unseizable on the screen and therefore it is highly probable that he/she changes the shooting state by a time difference longer than T1 and shorter than T2. Probability that the shooting state is changed after the time T2 when the moving object becomes unseizable on the screen is low. As a result, the function G2 can be expressed by FIG. 9.

On the other hand, when T2<T1, since the cameraman has difficulty in changing the shooting state before the moving object becomes unseizable on the screen, it is highly probable that the shooting state is changed at the human reaction rate T1. Since after T1 when the moving object changes its movement, the moving object is already outside the screen, a probability that the shooting state is changed after T1 is low. Accordingly, the function G2 can be expressed by FIG. 10.

(3) Method Using Function Based on Size of Moving Object on Screen

Time difference changes according to a size of a moving object on the screen. When the movement state of a large moving object changes, for example, because the cameraman is allowed to notice the movement quickly, he/she changes the shooting state by a short time difference.

On the other hand, when the movement state of a small moving object changes, it takes more time before noticing the change than in a case of a large moving object, so that the time difference will be large.

Assuming that a time difference changes according a size of the moving object on the screen based on the above-described properties, ρ(Di|i is a tracked object) can be calculated as set forth below by using a probability ρ(Di|i is a tracked object, s) that when the moving object i whose seeming size is s is a tracked object, the time difference is Di.

Figure 11:
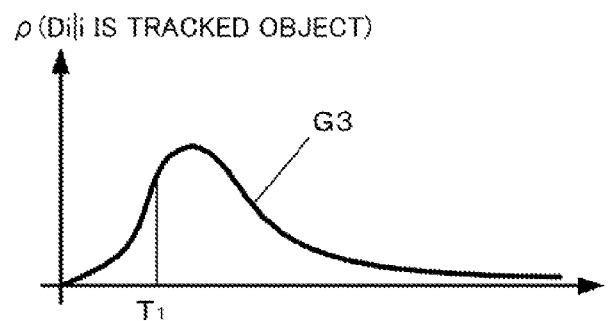
FIG. 11 is a diagram showing one example of a function expressing a relationship between a probability that the time difference is Di when the moving object i is a tracked object and the time difference based on a size of the moving object on the screen according to the first exemplary embodiment.
Figure 12:
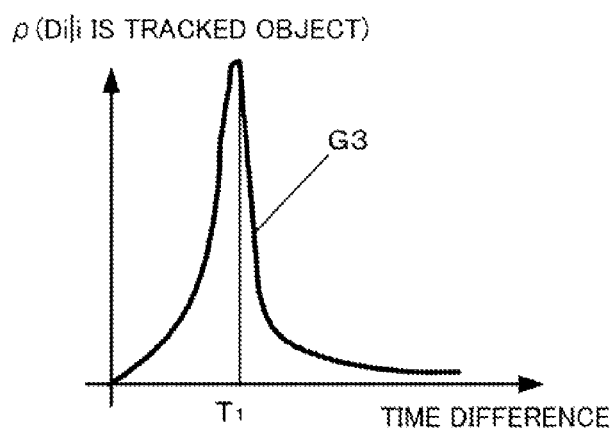
FIG. 12 is a diagram showing one example of a function expressing a relationship between a probability that the time difference is Di when the moving object i is a tracked object and the time difference based on the size of the moving object on the screen according to the first exemplary embodiment.

(NUMERICAL EXPRESSION 9)

$$\rho(D_i \mid i \text{ IS TRACKED OBJECT}) = \frac{\rho(D_i \mid i \text{ IS TRACKED OBJECT, s})}{\rho(s)} \quad \text{(Expression 10)}$$

ρ(s) represents a probability that a moving object appears in video with a seeming size s, which can be handled as a constant value when assuming that a probability that the moving object appears in every size is all equal.

ρ(Di|i is a tracked object, s) can be expressed by using a function G3 shown in FIG. 11 and FIG. 12. Seeming size of a moving object is represented as s and an average size of a moving object appearing in video is represented as S.

In a case of s<S, the cameraman fails to notice a change of a movement state of the moving object, so that it is highly probable that he or she changes the shooting state by a larger time difference than the reaction rate T1. The function G3 can be accordingly expressed by FIG. 11.

On the other hand, in a case of s>S, although the cameraman instantly notices a change of the movement state of the moving object, because it is difficult to change the shooting state by a shorter time difference than the reaction rate T1 of a human being, it is highly probable that he or she changes the shooting state with the reaction rate T1 of a human being. The function G3 can be accordingly expressed by FIG. 12.

In a case where the moving object i is a tracked object, a probability ρ(Di|i is a tracked object) that the time difference is Di may be expressed using the functions of (1), (2) and (3) or using other functions than those of (1), (2) and (3).

One example of operation of the tracking score calculation unit 113 will be described.

Figure 13:
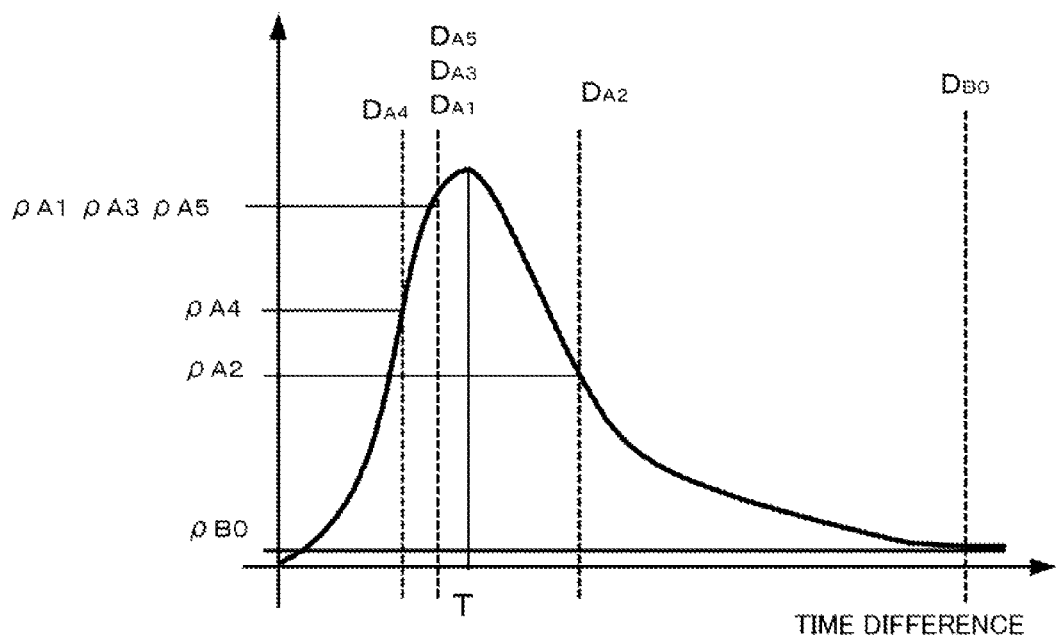
FIG. 13 is a diagram for use in explaining a method of calculating a probability that the time difference is Di when the moving object i is a tracked object according to the first exemplary embodiment.

Description will be made of a case where at Step A06, a time difference is calculated from a movement state change point at the most proximate time detected prior to the time of the shooting state change point with respect to each moving object to use the function G1 with reference to FIG. 4 and FIG. 13.

Figure 4:
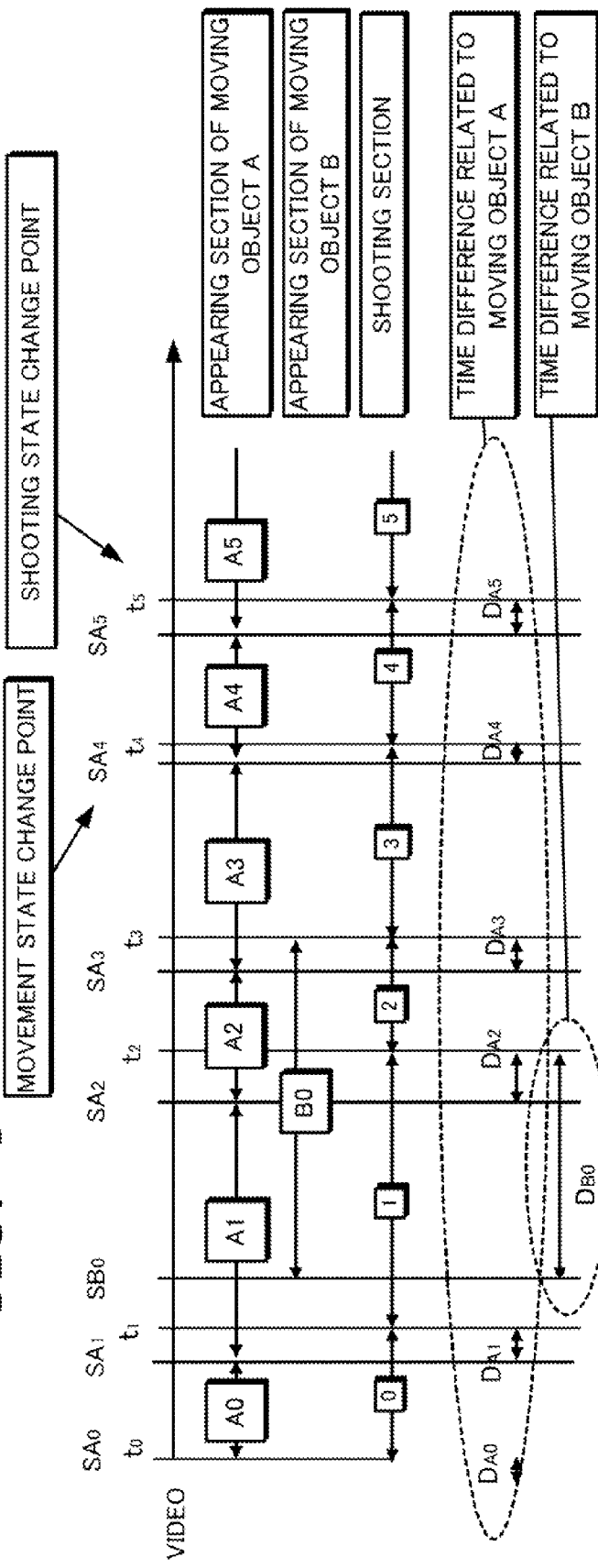
FIG. 4 is a diagram showing one example of a time difference according to the first exemplary embodiment.

When the shooting state change point is detected at time t1, calculate a time difference DA1 (=t1−sA1) related to a moving object A between sA1 as a movement state change point of the body A and time t1 from FIG. 4. Tracking score of the moving object A at time t1 will be accordingly RA1 (=ρA1/C'). The tracking score calculation unit 113 inputs {RA1, moving object information of the moving object A at time sA1} to the tracking determination unit 114.

When the shooting state is detected at time t2, calculate a tracking score RA2 (=ρA2/(C'+pB0)) of the moving object A at time t2 based on the time difference DA2 (=t2−sA2) related to the moving object A. Based on a time difference DB0 (=t2−sB0) related to a moving object B, calculate a tracking score RB0 (=pB0/(C'+pA2)) of the moving object B at time t2.

The tracking score calculation unit 113 inputs {RA2, moving object information of the moving object A at time sA2} and {RB0, moving object information of the moving object B at time sB0} to the tracking determination unit 114.

Hereafter, in the same manner, calculate a tracking score of each moving object at time t3, t4 and t5 when the shooting state change point is detected and input the tracking score and the moving object information to the tracking determination unit 114 as a calculation result.

When obtaining the tracking score and the moving object information from the tracking score calculation unit 113, the tracking determination unit 114 determines whether each moving object is a tracked object or not based on the tracking score and inputs the determination result and the moving object information to the determination result output unit 120 (Step A07).

Determination whether it is a tracked object or not is made by determining a moving object whose tracking score is larger than a predetermined threshold value as a tracked object.

For example, when RA0 through RA5 are not less than the threshold value and RB0 is not more than the threshold value, determine the moving object A as a tracking target at the shooting state change points t1, t2, t3, t4 and t5 and the moving object B as a non-tracked object at the shooting state change point t2.

The determination result output unit 120 outputs the determination result and the moving object information applied from the tracking determination unit 114. As an output format, ID of a moving object, image data of the moving object, time of a movement state change point of the moving object and a determination result are presented on a screen in a table format as shown in FIG. 14.

Alternatively, the following is possible as a method of displaying all the determination results in the lump after executing tracking determination of a moving object with respect to all the frames of video. As shown in FIG. 15, the same moving object IDs are presented on the screen in the lump.

Alternatively, it is also possible to compare image data of moving bodies having different IDs and after newly applying the same ID to image data whose similarity is within the threshold value, present the determination results of the same ID on the screen in the lump.

Determination of similarity between image data of moving bodies can be realized by a method of determining the image data to be similar when a color difference between image data is not more than a threshold value or a method of calculating such image characteristic amount as color histogram, edge characteristic amount and color dispersion from image data and determining the image data to be similar when the difference in the image characteristic amount is not more than the threshold value. As image data, the most average image data among image data of the moving object may be selected.

Alternatively, with image data of each moving object determined to be a tracked object as a template, detect a moving object appearing section from input video and reproduce the same. As a result, the user is allowed to watch and listen to all the video segments in which a moving object tracked and captured at least once in video appears.

Alternatively, it is also possible to select, among sections in which the same moving object appears, a section in which image data of the moving object is the largest, a section in which a speed of the moving object is the lowest, a section in which a kind of camera work is fixed or a section in which a rate of camera work is the lowest to reproduce the selected section or present a center frame of the selected section as a representative image. As a result, the user is allowed to watch and listen to video in which each tracked object is easy to seize or check a representative image.

(Effects of the First Exemplary Embodiment)

Next, effects of the present exemplary embodiment will be described.

In the method according to the related art, determination whether a moving object is a tracked object or not is made based on a distribution state of moving regions as image regions having a motion vector different from a motion vector generated by the movement of a camera. Therefore, when a distribution of moving regions fails to satisfy the property that "constantly exists in the lump" because a speed of a moving object and a speed of a camera are different, it is impossible to determine a moving object which is a set of moving regions to be a target object.

On the other hand, in the present exemplary embodiment, determination whether the moving object is a tracked object or not is made based on a difference between time of a change of a movement state of the moving object and time of a change of a shooting state.

Therefore, the effect can be obtained of determining a moving object to be a tracked object according to a time difference between time of a change of the movement of the moving object and time of a change of the shooting state in such a case where the moving object fails to constantly exist at a fixed position on the screen as a case where shot ends before a camera speed goes equal to a speed of a moving object because the shot is short, a case where a cameraman is not allowed to predict a shifting destination of a moving object because the moving object constantly makes unpredictable movement or a case where a camera speed varies during tracking shooting as in shooting using a telephoto camera.

In addition, since in the method according to the related art, determination whether a moving object is a tracked object or not is made based on a rate of a partial section in which the moving object can be stably tracked among video segments, it is impossible to determine the moving object as a tracked object before the video segment ends in which shooting is executed while moving the camera in a fixed direction.

On the other hand, according to the present exemplary embodiment, since determination whether a moving object is a tracked object or not is made based on a difference between time of a change of a movement state of the moving object and time of a change of a shooting state, it is possible to determine the moving object as a tracked object before the video segment in which shooting is executed while moving the camera in a fixed direction ends.

(Second Exemplary Embodiment)

Next, a second exemplary embodiment of the present invention will be detailed with reference to the drawings.

Figure 16:
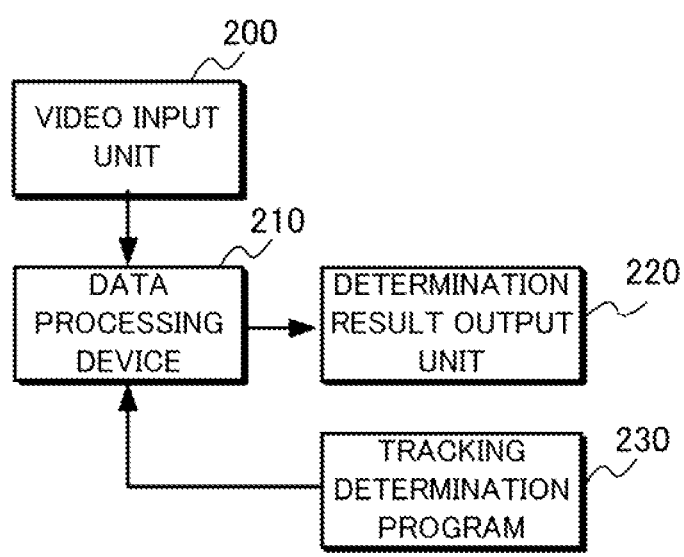
FIG. 16 is a block diagram showing a structure of a tracked object determination device according to a second exemplary embodiment of the present invention.

With reference to FIG. 16, the second exemplary embodiment of the present invention comprises a tracking determination program in addition to the components of the first exemplary embodiment of the present invention.

A tracking determination program 230 is read into a data processing device 210 to control operation of the data processing device 210 and output a determination result obtained by a unit in the data processing device 210 to a determination result output unit 220.

The data processing device 210 executes the same processing as that by the data processing device 110 in the first exemplary embodiment by the control of the tracking determination program 230.

(Effects of the Second Exemplary Embodiment)

The present exemplary embodiment produces an effect of executing tracked object determination by an external program.

FIRST EXAMPLE

Next, operation of a tracked object determination device of the present invention will be descried with reference to a specific example.

The present example corresponds to the first exemplary embodiment of the present invention. In the present example, shown is an example where the tracked object determination device of the present invention is applied to video obtained by tracking and shooting a state where the person A walking rightward suddenly stops and starts running rightward.

(Description of Structure)

Figure 17:
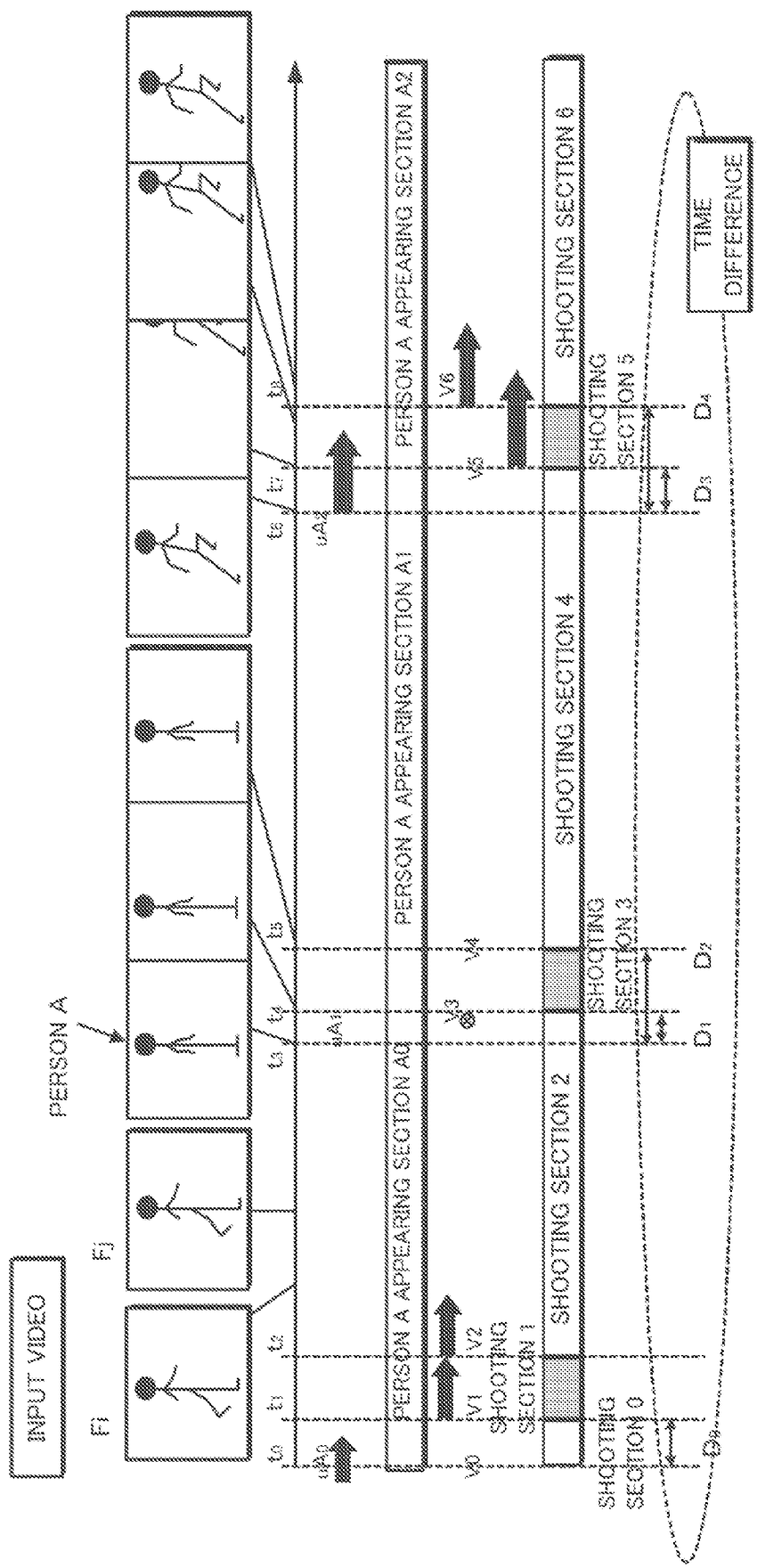
FIG. 17 is a diagram showing outlines of input video in a first example.

FIG. 17 shows outlines of input video. The person A existing at the center of the screen starts walking at time t0. After stopping and standing still at time t3, the person A starts running toward the right direction at t6.

The cameraman notices the person A starting moving and operates a camera at a rate equal to a walking rate of the person A at time t1. React to standstill of the person A at time t4, move the camera counterclockwise at t5 and after seizing the person A at the center of a frame at t6, bring the camera to a standstill. React to the person A starting running at time t7 to start operating the camera with acceleration, seize the person A on the screen at time t8 and operate the camera at a rate equal to the running rate of the person after time t8.

Figure 18:
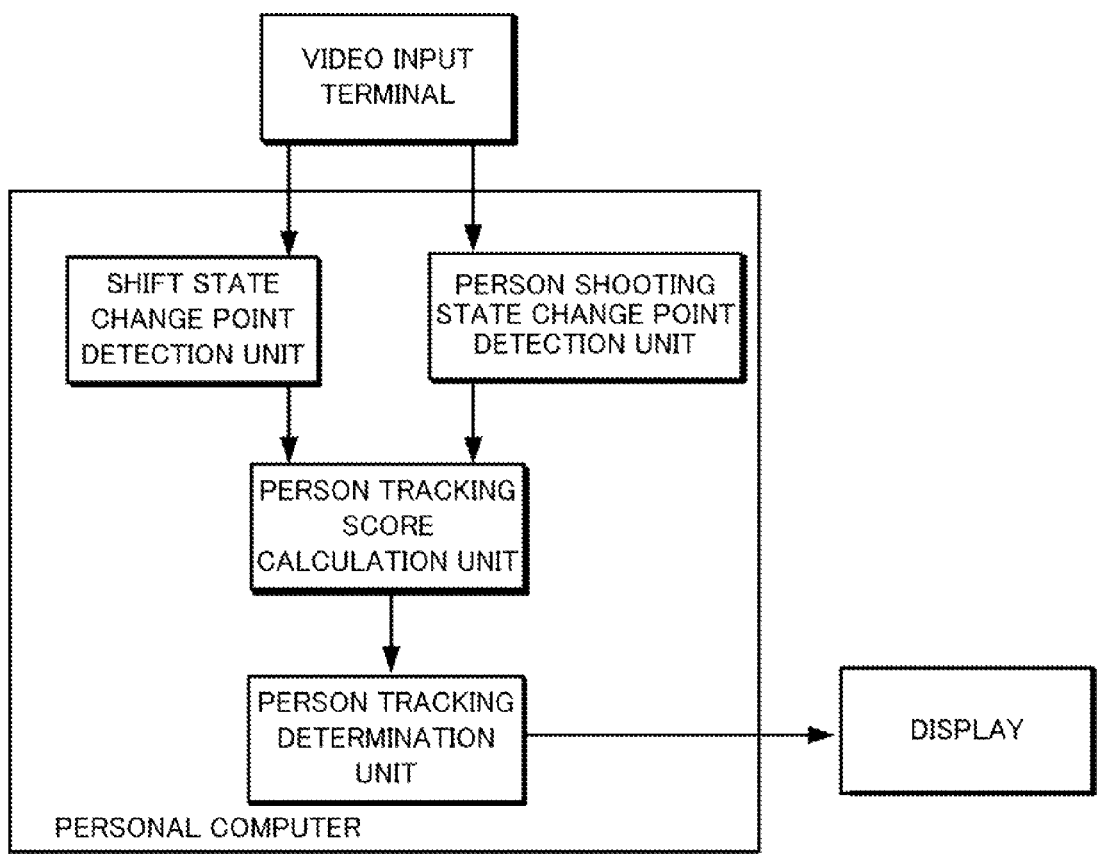
FIG. 18 is a block diagram showing a structure of the first example.

As shown in FIG. 18, according to the present example, provided are a video input terminal as a video input unit, a personal computer as a data processing device and a display as a video output device.

The personal computer has a central processing unit which functions as a shift state change point detection unit, a person shooting state change point detection unit, a person tracking score calculation unit and a person tracking determination unit.

(Description of Operation)

Assume now that each frame forming video is applied from a video input terminal.

The shift state change point detection unit of the central processing unit detects a person region from the input frame and extracts a person's ID, image data of the person region, a seeming position of the person, a motion vector of the person and a shift state of the person as person information. Shift state of a person represents a state determined by a motion vector of a person, each of which state is assumed to be determined by a direction and a rate of a motion vector.

When the shift state of the person changes in the input frame, the shift state change point detection unit inputs time and person information to the person tracking score calculation unit.

Means for detecting a person region includes a method using information obtained from an entire person region. Possible, for example, is a method of storing images in which various persons appear as a template and determining that a person exists in the input image when a difference between the input image and the template is not more than a threshold value.

Another possible method is storing in advance a model combining color information such as a skin color and an edge direction or density and determining that a person exists when a region similar to the model is detected from an input frame.

Among methods of statistically learning a characteristic amount distribution obtained from learning samples of a large amount of person region images and non-person region images and determining to which distribution of the person region images or the non-person region images the characteristic amount obtained from an input image belongs are those using neural network, support vector machine and Adaboost.

Further possible is a method using face information of a person. Among such methods are, as disclosed in the Non-Patent Literature 2, for example, a method of detecting a face by using a template generated making use of the fact that a profile of a face (head) is oblong and an eye and a mouse have an elongated shape, a face detection method making use of characteristics of a luminance distribution that a part of a cheek or a front head has high luminance and a part of an eye or a mouse has low luminance and a method of detecting a face making use of symmetry of a face or skin color region and position.

It is further possible, when a face of a person is detected by the above-described example or other method, to determine a face and a fixed region in a lower part of the face as a person region. As a method of detecting a person, the above-described example may be used or other method may be applied.

Related art of the person region detection means is disclosed in Non-Patent Literature 2.

Person ID is applied by the following procedure when a template-based method is used for the person region detection means.

First, with an image in which various persons registered in advance appear as a template, apply "person A" to a person region detected from an image frame at time t0. Newly register an image of the person A detected as a template and when a person region detected in the subsequent or following frame is similar to the image of the person A, apply the same ID "person A". When it is not similar to the image of the person A, apply a new ID.

Image data of a person region is assumed to be a rectangular region including a person region detected by the person region detection unit.

Seeming position of a person is assumed to be the center of gravity coordinates of a person region in a frame image.

Motion vector of a person region can be extracted by a method using a template set forth in the following.

Detect a person region from an input frame Fi to obtain a rectangular region including the person region as a template. With respect to a frame Fj (j>i), scan a fixed range centered around the center of gravity coordinates of the person region on the frame Fi and detect a region similar to the template to obtain the center of gravity coordinates of the detected region.

Obtain an angle of turning toward the pan direction and the tilt direction from the initial state of a camera in the frames Fi and Fj and obtain absolute coordinates of the positions of the center of gravity of the person regions in the frames Fi and Fj, respectively, by substituting the obtained angle into the Expression 2 to calculate a motion vector of the person A based on a difference between the obtained positions.

The angle of turning toward the pan direction and the tilt direction from the initial state of a camera can be obtained by a GPS or an angular velocity sensor mounted on the camera.

Movement state of a person region is assumed to be a mean value of motion vectors each detected in several past frames, and time when the mean value changes more than a threshold value set in advance is detected as a movement state change point. Example of a shift state of the person region is shown in FIG. 17.

In a case of input video, the shift state change point detection unit obtains a motion vector uA0 of the person at time t0, a motion vector uA1 of the person at time t3, and a motion vector uA2 of the person at time t6. Shift state change point of the person A is detected at time t0, t3 and t6 and time and person information are input to the person tracking score calculation unit at each time.

The person shooting state change point detection unit obtains a motion vector of a camera motion and a shooting state from the input frame as shooting information.

Shooting information is obtained from an angular velocity sensor mounted on the camera. Time point where the motion vector of the camera motion changes more than the threshold value is detected as a shooting state change point. When the input frame corresponds to the shooting state change point, input the time of the shooting state change point and shooting information as of the shooting state change point to the person tracking score calculation unit and when the input frame is not the shooting state change point, input a subsequent frame from the video input terminal.

As a rate of camera work, the person shooting state change point detection unit obtains v0 at time t0, v1 at time t1, v2 at time t2, v3 at time t4, v4 at time t5, v5 at time t7 and v6 at time t8. One example of the shooting states is shown in FIG. 17.

When the time of the shooting state change point is input from the person shooting state change point detection unit, the person tracking score calculation unit calculates a time difference related to each person between the input time and time of the shift state change point already input from the shift state change point detection unit. Calculate a tracking score of the person based on the time difference to input the tracking score and the person information to the person tracking determination unit.

Time difference is calculated between the time of the shooting state change point and the time of the shift state change point as a shift state in which a position of an absolute coordinate system of the person predicted after a little time $\Delta t$ from the time of the shooting state change point conies to a point on the frame image after $\Delta t$ among shift state change points detected before the time of the person shooting state change point.

Figure 19:
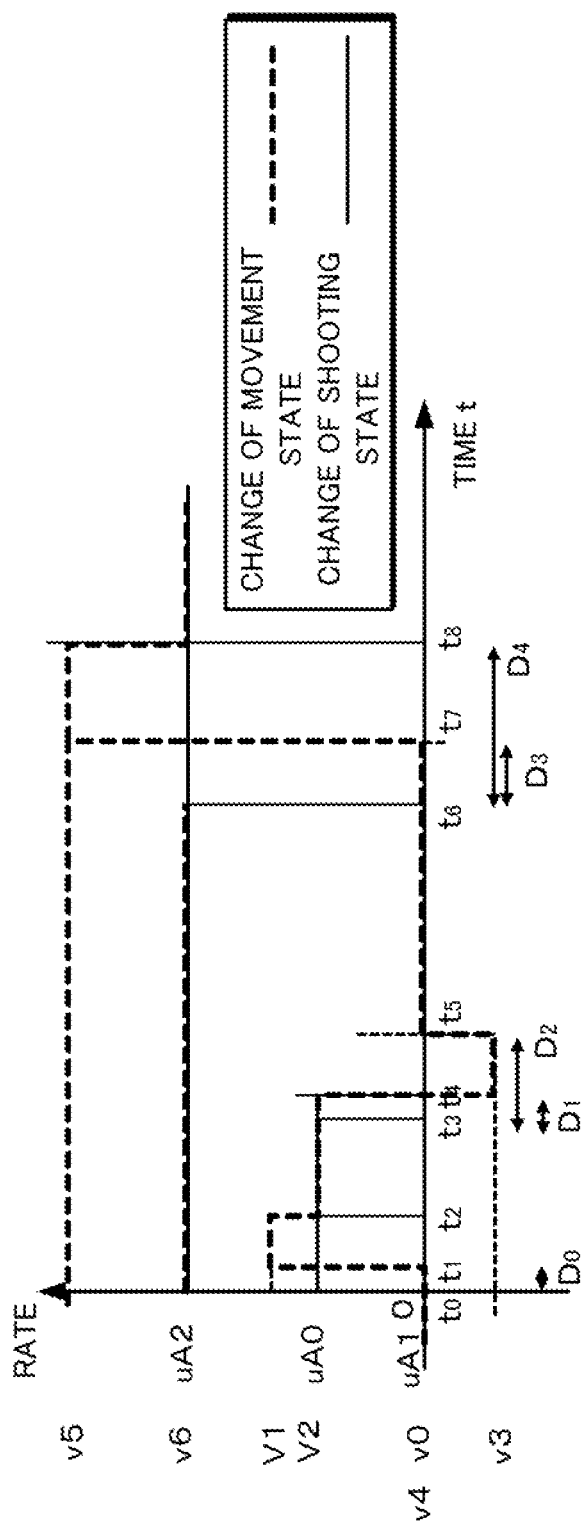
FIG. 19 is a diagram for use in explaining a combination between a shooting state change point and a shift state change point at which a time difference is calculated according to the first example.

Combination between a shooting state change point and a shift state change point for the calculation of a time difference will be described with reference to FIG. 19.

When detecting the shooting state change point at time t1, determine whether to calculate a time difference from the shift state change point t0 detected before t1. With a position in the absolute coordinate system of the person at time 0 as Q0, a position Q1 in the absolute coordinate system of the person at time t1+$\Delta t$ will be expressed as Q0+(t1+$\Delta t$)*uA0.

On the other hand, with the center of a frame image at time 0 as O0, the center position of the frame image at time t1+$\Delta t$ will be shifted to O0+v1*$\Delta t$. When on this occasion, there exists $\Delta t$(<TH2) having {Q0+(t1+$\Delta t$)*uA0}={O0+v1*$\Delta t$+TH1}, calculate a time difference D0 (=t1−t0) between the shooting state change point t1 and the shift state change point t0.

TH1 represents a distance from the center of the screen where the moving object exists after $\Delta t$, and a user sets in advance TH1 to be 0 when locating at the center and TH1 to be W when locating at the left or right ends of the screen. TH2 represents a time difference for seizing, when the moving object is a tracked object, the tracked object at the position of TH1 after $\Delta t$. As TH1, two or three seconds are ordinarily set.

With TH1=0 in input video, because of Q0=O0, $\Delta t$=uA0/(v1−uA0) holds. When $\Delta t$ is several seconds, a time difference is calculated between the shooting state change point t1 and the shift state change point t0.

When the shooting state change point is detected at time t2, determine whether to calculate a time difference from the shift state change point t0 detected before t2. Position in the absolute coordinate system of the person A after $\Delta t$ from t2 is Q0+(t2+$\Delta t$)*uA0.

On the other hand, the center position of the frame image at time t2+$\Delta t$ is O0+(t2−t1)*v1+v2*$\Delta t$. At this time, since uA0=v2, {Q0+(t2+$\Delta t$)*uA0}={O0+(t2−t1)*v1+v2*$\Delta t$} holds at an arbitrary $\Delta t$, so that a time difference D1 (=t2−t0) is calculated between the shooting state change point t2 and the shift state change point t0.

Similarly, calculate a time difference D2 at time t4, a time difference D3 at time t5, a time difference D4 at time t6 and a time difference D5 at time t8.

Tracking score is calculated using the function G2 based on a position and a rate of the moving object on the screen in a manner described in the following.

At time t1, calculate a tracking score R0 in a manner as follows based on a time difference calculated between the shooting state change point t1 and the shift state change point t2. Since at time t0, a seeming position of the person A is the center of the screen and a seeming speed of the person is uA0, time T before the person A becomes unseizable on the screen will be expressed as W/(2*|uA0|) from the Expression 9.

Figure 20:
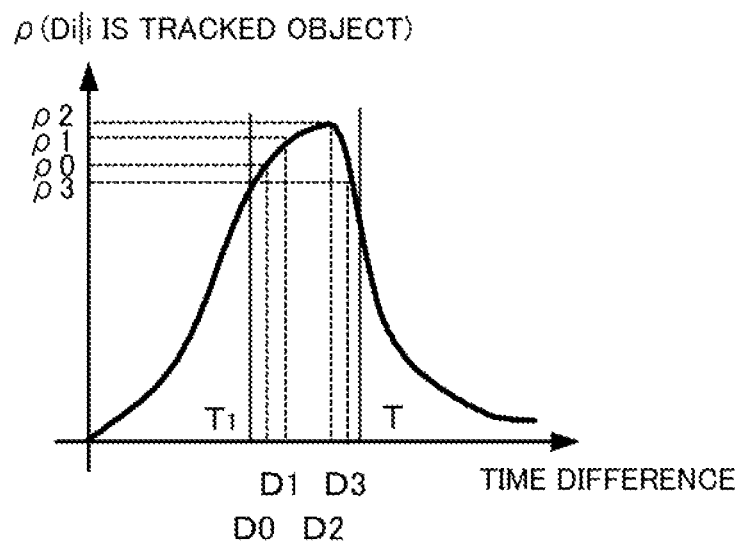
FIG. 20 is a diagram showing a function for calculating a probability that the time difference is Di when the moving object i is a tracked object according to the first example.

Therefore, use the function shown in FIG. 9. The function is shown in FIG. 20. Since at time t1, the time difference is D0, the tracking score of the person will be R0(=ρ0/C'). Input {R0, shift information of the person A as of time t0} to the person tracking determination unit.

At time t2, calculate a tracking score R1 in a manner set forth below based on a time difference calculated between the shooting state change point t2 and the shift state change point t1. Since at time t0, the seeming position of the person A is the center of the screen and the seeming speed of the person A is uA0, the function shown in FIG. 20 is used. Since at time t2, the time difference is D1, the tracking score of the person will be R1 (=ρ1/C'). Input {R1, shift information of the person A as of time t0} to the person tracking determination unit. At time t4, calculate a tracking score R2 in a manner set forth below based on a time difference calculated between the shooting state change point t3 and the shift state change point t2. Since at time t3, the seeming position of the person A is the center of the screen and the seeming speed of the person A is −v2 (=−uA0), the function shown in FIG. 20 is used.

Since at time t4, the time difference is D2, the tracking score will be R2 (=ρ2/C'). Input {R2, shift information of the person A as of time t3} to the person tracking determination unit.

Similarly, at time t5, calculate a tracking score R3 (=ρ3/C') based on the time difference D3 to input {Re, shift information of the person A as of time t3} to the person tracking determination unit.

At time t7, calculate a tracking score R4 in a manner set forth below based on a time difference calculated between the shooting state change point 7 and the shift state change point t6. Since at time t6, the seeming position of the person A is the center of the screen and the seeming speed of the person is uA2, time T' before the person becomes unseizable on the screen will be expressed as W/(2*|uA2|) from the Expression 9.

Figure 21:
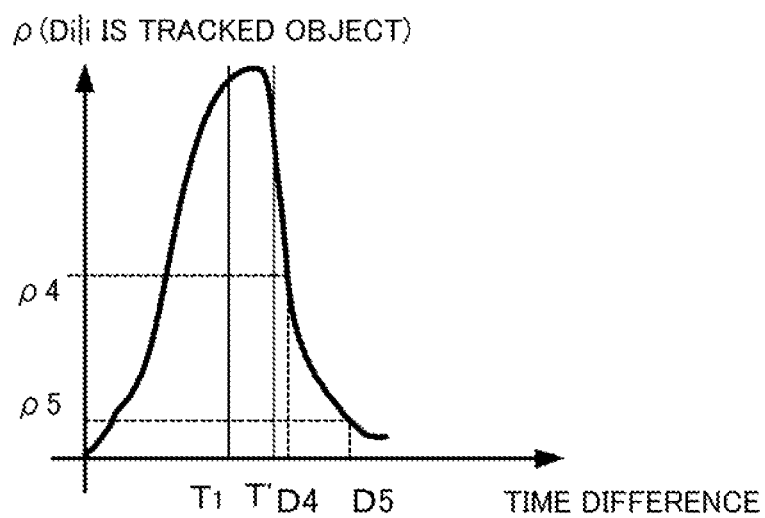
FIG. 21 is a diagram showing a function for calculating a probability that the time difference is Di when the moving object i is a tracked object according to the first example.

Therefore, use the function shown in FIG. 21. Because of |uA2|>|uA0|, T'<T holds. Since a time difference is D4 at time t7, the tracking score of the person will be R4 (=ρ4/C'). Input {R4, shift information of the person A as of time t6} to the person tracking determination unit.

Similarly, at time t8, calculate a tracking score R5 (=ρ5/C') based on the time difference D5 to input {R5, shift information of the person A as of time t6} to the person tracking determination unit.

When a tracking score and person information are input, the person tracking determination unit determines the person A to be a tracked object in a case where the tracking score is larger than a threshold value Rth determined in advance. The person tracking determination unit inputs a tracking determination result and person information to a display.

Figure 22:
FIG. 22 is a diagram showing one example of output of a tracking determination result according to the first example.
Figure 23:
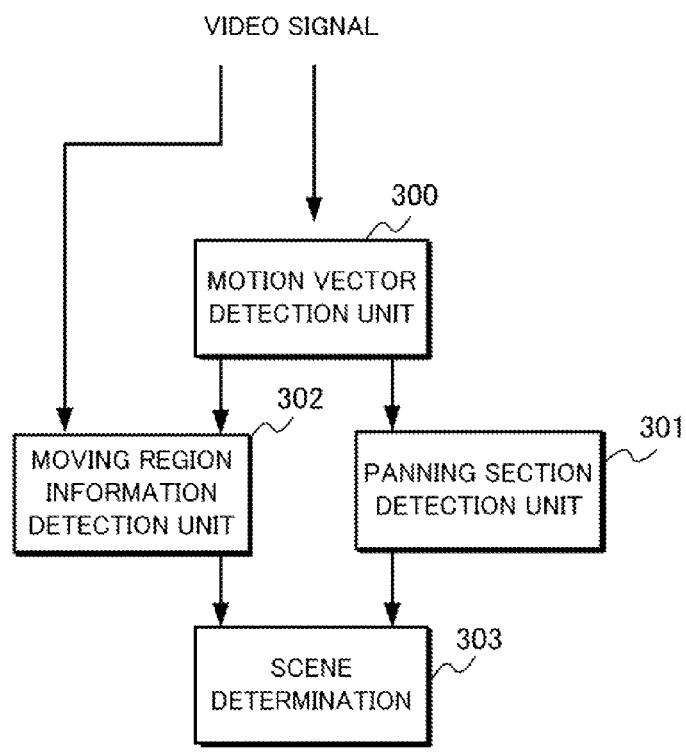
FIG. 23 is a block diagram showing an example of a tracked object determination device according to the related art.

On the display, determination results of entire video are displayed in the lump related to a person ID, an image, appearing time and a determination result. One example of displaying of determination results is shown in FIG. 22.

Displayed in an image is image data of a shift state change with the smallest speed of the person A based on person information of the person A as of all the shift state change points. As a result, it is possible to display an image without motion blur due to movement of the person A.

As appearing time, times of all the shift state change points of the person A are displayed in the lump. As a determination result, "tracking" is displayed.

Although the present invention has been described with respect to the preferred exemplary embodiments and example in the foregoing, the present invention is not necessarily limited to the above-described exemplary embodiments and example but can be modified without departing from the scope of its technical idea.

INCORPORATION BY REFERENCE

This application is based upon and claims the benefit of priority from Japanese patent application No. 2009-085963, filed on Mar. 31, 2009, the disclosure of which is incorporated herein in its entirety by reference.

INDUSTRIAL APPLICABILITY

The present invention is applicable to a tracked object determination device which determines whether a moving object appearing in video is a tracked object or not, for the generation of a list of tracked objects appearing in video, in order to generate summarized video by which the tracked object can be seized by specifying a section in which the tracked object appears or in order to extract a representative image group in which the tracked object can be seized by selecting a frame casting the tracked object clearly from among sections in which the tracked object appears, and a program for realizing the tracking target determination device on a computer. The present invention can be also used as a tracked object determination device for selecting a video segment for organizing, classifying and editing video based on a tracked object in home video or material video.

What is claimed is:

1. A tracked object determination device comprising:
   a movement state change point detection unit which detects a movement state change point as a time when a movement state determined by a motion vector of a moving object changes;
   a shooting state change point detection unit which detects a shooting state change point as a time when a shooting state determined by a motion vector of a camera motion of said video changes;
   a tracking score calculation unit which with a difference between the time of said shooting state change point and the time of said movement state change point as a time difference of said moving object, calculates a tracking score of said moving object based on the time difference of said moving object; and
   a tracked object determination unit which determines whether said moving object is an object tracked by a cameraman based on the tracking score of said moving object.

2. The tracked object determination device according to claim 1, wherein said movement state change point detection unit detects a motion vector generated by operation of a camera from an input frame as a motion vector of a camera motion from input frames and detects a movement state change point based on the amount of speed change on real space of the moving object which is a region moving with a different motion vector from said motion vector of a camera motion.

3. The tracked object determination device according to claim 1, wherein said shooting state change point detection unit detects a motion vector generated by operation of a camera from an input frame as a motion vector of a camera motion and detects a shooting state change point based on the amount of change of the motion vector of said camera motion.

4. The tracked object determination device according to claim 2, wherein said movement state change point detection unit calculates the motion vector of said camera motion based on the amount of position shift of the camera obtained by GPS or an angular velocity sensor mounted on the camera.

5. The tracked object determination device according to claim 3, wherein a motion vector is detected from each partial region of the input frame and said motion vector is grouped according to similarity in direction and size to take the motion vector of said camera motion as a representative vector of motion vectors belonging to the largest group.

6. The tracked object determination device according to claim 1, wherein said tracking score calculation unit calculates a time difference between time of the shooting state change point and the movement state change point detected before the time of said shooting state change point.

7. The tracked object determination device according to claim 1, wherein said tracking score calculation unit calculates a time difference between time of the shooting state change point and time of the most proximate movement state change point among movement state change points detected before the time of said shooting state change point.

8. The tracked object determination device according to claim 1, wherein said tracking score calculation unit calculates a time difference between time of the shooting state change point and time of a movement state change point as a movement state of a moving object which is the most similar to the shooting state at said shooting state change point among movement state change points detected before the time of said shooting state change point.

9. The tracked object determination device according to claim 1, wherein said tracking score calculation unit calculates a time difference between time of the shooting state change point and time of a movement state change point as a movement state in which a position of the moving object in an absolute coordinate system predicted after a little time Δt from the time of the shooting state change point comes to a point on a frame image after Δt among movement state change points detected before the time of said shooting state change point.

10. The tracked object determination device according to claim 1, wherein said tracking score calculation unit calculates a tracking score based on a time difference of said moving object and prior knowledge of time required for tracking and shooting an object tracked by the cameraman at a specific movement state.

11. The tracked object determination device according to claim 1, wherein said tracking score calculation unit calculates a tracking score based on a time difference of said moving object and prior knowledge of time required for tracking and shooting an object tracked by the cameraman at a specific movement state including any of a specific size, a specific position and a specific rate.

12. The tracked object determination device according to claim 1, wherein said tracked object determination unit determines that a moving object is an object tracked by the cameraman when the tracking score is not less than a predetermined threshold value.

13. A tracked object determination method comprising:
a movement state change point detection step of detecting a movement state change point as a time when a movement state determined by a motion vector of a moving object changes;
a shooting state change point detection step of detecting a shooting state change point as a time when a shooting state determined by a motion vector of a camera motion of said video changes;
a tracking score calculation step of, with a difference between the time of said shooting state change point and the time of said movement state change point as a time difference of said moving object, calculating a tracking score of said moving object based on the time difference of said moving object; and
a tracked object determination step of determining whether said moving object is a tracked and captured object based on the tracking score of said moving object.

14. The tracked object determination method according to claim 13, wherein at said movement state change point detection step, a motion vector generated by operation of a camera is detected from an input frame as a motion vector of a camera motion and a movement state change point is detected based on the amount of change in a speed of the moving object on real space which moving object is a region having a motion vector different from the motion vector of said camera motion.

15. The tracked object determination method according to claim 13, wherein at said shooting state change point detection step, a motion vector generated by operation of a camera is detected from an input frame as a motion vector of a camera motion and a shooting state change point is detected based on the amount of change of the motion vector of said camera motion.

16. The tracked object determination method according to claim 14, wherein at said movement state change point detection step, the motion vector of said camera motion is calculated based on the amount of position shift of the camera obtained by GPS or an angular velocity sensor mounted on the camera.

17. The tracked object determination method according to claim 14, wherein a motion vector is detected from each partial region of the input frame and said motion vector is grouped according to similarity in direction and size to take the motion vector of said camera motion as a representative vector of motion vectors belonging to the largest group.

18. The tracked object determination method according to claim 13, wherein at said tracking score calculation step, a time difference is calculated between time of the shooting state change point and the movement state change point detected before the time of said shooting state change point.

19. The tracked object determination method according to claim 13, wherein at said tracking score calculation step, a time difference is calculated between time of the shooting state change point and time of the most proximate movement state change point among movement state change points detected before the time of said shooting state change point.

20. The tracked object determination method according to claim 13, wherein at said tracking score calculation step, a time difference is calculated between time of the shooting state change point and time of a movement state change point as a movement state of a moving object which is the most similar to the shooting state at said shooting state change point among movement state change points detected before the time of said shooting state change point.

21. The tracked object determination method according to claim 13, wherein at said tracking score calculation step, a time difference is calculated between time of the shooting state change point and time of a movement state change point as a movement state in which a position of the moving object in an absolute coordinate system predicted after a little time Δt from the time of the shooting state change point comes to a point on a frame image after Δt among movement state change points detected before the time of said shooting state change point.

22. The tracked object determination method according to claim 13, wherein at said tracking score calculation step, a tracking score is calculated based on a time difference of said moving object and prior knowledge of time required for tracking and shooting a tracked and captured object at a specific movement state.

23. The tracked object determination method according to claim 13, wherein at said tracking score calculation step, a tracking score is calculated based on a time difference of said moving object and prior knowledge of time required for tracking and shooting a tracked and captured object at a specific movement state including any of a specific size, a specific position and a specific rate.

24. The tracked object determination method according to claim 13, wherein at said tracked object determination step, determination is made that a moving object is a tracked and captured object when the tracking score is not less than a predetermined threshold value.

25. A non-transitory computer-readable medium storing a tracked object determination program, which when executed by a computer, causes said computer to execute:
a movement state change point detection processing of detecting a movement state change point as a time when a movement state determined by a motion vector of a moving object changes, a shooting state change point detection processing of detecting a shooting state change point as a time when a shooting state determined by a motion vector of a camera motion of said video changes, a tracking score calculation processing of, with a difference between the time of said shooting state change point and the time of said movement state change point as a time difference of said moving object, calculating a tracking score of said moving object based on the time difference of said moving object, and a tracked object determination processing of determining whether said moving object is a tracked and captured object based on the tracking score of said moving object.

26. The non-transitory computer-readable medium according to claim 25, wherein in said movement state change point detection processing, a motion vector generated by operation of a camera is detected from an input frame as a motion vector of a camera motion and a movement state change point is detected based on the amount of change in a speed of the moving object on real space which moving object is a region having a motion vector different from the motion vector of said camera motion.

27. The non-transitory computer-readable medium according to claim 25, wherein in said shooting state change point detection processing, a motion vector generated by operation of a camera is detected from an input frame as a motion vector of a camera motion and a shooting state change point is detected based on the amount of change of the motion vector of said camera motion.

28. The non-transitory computer-readable medium according to claim 26, wherein the motion vector of said camera motion is calculated based on the amount of position shift of the camera obtained by GPS or an angular velocity sensor mounted on the camera.

29. The non-transitory computer-readable medium according to claim 26, wherein a motion vector is detected from each partial region of the input frame and said motion vector is grouped according to similarity in direction and size to take the motion vector of said camera motion as a representative vector of motion vectors belonging to the largest group.

30. The non-transitory computer-readable medium according to claim 25, wherein in said tracking score calculation processing, a time difference is calculated between time of the shooting state change point and the movement state change point detected before the time of said shooting state change point.

31. The non-transitory computer-readable medium according to claim 25, wherein in said tracking score calculation processing, a time difference is calculated between time of the shooting state change point and time of the most proximate movement state change point among movement state change points detected before the time of said shooting state change point.

32. The non-transitory computer-readable medium according to claim 25, wherein in said tracking score calculation processing, a time difference is calculated between time of the shooting state change point and time of a movement state change point as a movement state of a moving object which is the most similar to the shooting state at said shooting state change point among movement state change points detected before the time of said shooting state change point.

33. The non-transitory computer-readable medium according to claim 25, wherein in said tracking score calculation processing, a time difference is calculated between time of the shooting state change point and time of a movement state change point as a movement state in which a position of the moving object in an absolute coordinate system predicted after a little time $\Delta t$ from the time of the shooting state change point comes to a point on a frame image after $\Delta t$ among movement state change points detected before the time of said shooting state change point.

34. The non-transitory computer-readable medium according to claim 25, wherein in said tracking score calculation processing, a tracking score is calculated based on a time difference of said moving object and prior knowledge of time required for tracking and shooting a tracked and captured object at a specific movement state.

35. The non-transitory computer-readable medium according to claim 25, wherein in said tracking score calculation processing, a tracking score is calculated based on a time difference of said moving object and prior knowledge of time required for tracking and shooting a tracked and captured object at a specific movement state including any of a specific size, a specific position and a specific rate.

36. The non-transitory computer-readable medium according to claim 25, wherein in said tracked object determination processing, determination is made that a moving object is a tracked and captured object when the tracking score is not less than a predetermined threshold value.

* * * * *